(12) United States Patent
Gerteis

(10) Patent No.: US 6,408,703 B2
(45) Date of Patent: Jun. 25, 2002

(54) APPARATUS FOR CARRYING OUT A WEIGHT MEASUREMENT IN CENTRIFUGES

(75) Inventor: Hans Gerteis, Bietigheim-Bissingen (DE)

(73) Assignee: Heinkel Aktiengesellschaft, Bietigheim-Bissingen (DE)

(*) Notice: Subject to any disclaimer, the term of this patent is extended or adjusted under 35 U.S.C. 154(b) by 0 days.

(21) Appl. No.: 09/974,949

(22) Filed: Oct. 11, 2001

Related U.S. Application Data

(62) Division of application No. 09/482,774, filed on Jan. 13, 2000, now Pat. No. 6,314,824, which is a continuation of application No. PCT/EP98/03123, filed on May 27, 1998.

(30) Foreign Application Priority Data

Jul. 25, 1997 (DE) ......................................... 197 32 006

(51) Int. Cl.⁷ ............................................. G01G 19/52
(52) U.S. Cl. .......................................... 73/865; 73/1.87
(58) Field of Search ..................... 73/865, 1.13, 1.87; 177/132, 245, 246, 50; 494/10

(56) References Cited

U.S. PATENT DOCUMENTS

| | | | |
|---|---|---|---|
| 3,655,123 A | 4/1972 | Judson et al. | ................. 177/245 |
| 3,970,243 A * | 7/1976 | Hertschel | ................. 494/10 X |
| 4,557,717 A | 12/1985 | Friedman | ................. 494/10 |
| 4,952,127 A * | 8/1990 | Schmeisser et al. | ...... 494/10 X |
| 5,092,995 A | 3/1992 | Gerteis | ................. 210/232 |
| 5,304,306 A | 4/1994 | Gerteis | ................. 210/380.3 |
| 5,371,329 A | 12/1994 | Fillaud | ................. 177/245 |
| 5,665,925 A * | 9/1997 | Gerteis | ................. 73/865 |

FOREIGN PATENT DOCUMENTS

| | | | | |
|---|---|---|---|---|
| DE | 1002691 | * | 2/1957 | |
| DE | 1007701 | * | 5/1957 | |
| DE | 1101295 | * | 3/1961 | |
| DE | 43160810 C1 | * | 8/1994 | ............ G01G/9/00 |
| DE | 196 45 511 C1 | | 4/1998 | |
| WO | WO 92/04982 | * | 4/1972 | ............ B04B/3/02 |
| WO | WO 89/05193 | * | 6/1989 | ............ B04B/3/02 |

* cited by examiner

*Primary Examiner*—Thomas P. Noland
(74) *Attorney, Agent, or Firm*—Leydig, Voit & Mayer, Ltd.

(57) ABSTRACT

An apparatus for carrying out a weight measurement in centrifuges for separating suspensions into their solid and liquid components comprises a machine housing, a drum rotatingly mounted in the machine housing and receiving the suspension, and a filler pipe leading into the drum for feeding the suspension into the drum. The machine housing is mounted for pivotal movement about an axis of rotation, and a force measuring element senses weight-dependent deflections of the machine housing occurring about the axis of rotation and originating from a different degree of filling of the drum with suspension or from a different dewatering of the solid suspension components, and the machine housing deflections are indicated on a measurement value indicator. A pipeline is provided for generating a positive pressure or a negative pressure in the drum. The line of application of the force generated in this pipeline on account of the positive pressure or the negative pressure is guided so as to intersect the axis of rotation of the machine housing, or a sensor is provided for sensing the pressure in the drum and correcting the measurement value indicator in dependence upon the pressure.

1 Claim, 5 Drawing Sheets

APPARATUS FOR CARRYING OUT A WEIGHT MEASUREMENT IN CENTRIFUGES

CROSS-REFERENCE TO RELATED APPLICATION

This application is a divisional of application Ser. No. 09/482,774, filed Jan. 13, 2000, now U.S. Pat. No. 6,314,824, which was a continuation of PCT/EP98/03123, filed May. 27, 1998, which claimed priority to DE197320066, filed Jul. 25, 1997.

BACKGROUND OF THE INVENTION

The invention relates to an apparatus for carrying out a weight measurement in centrifuges for separating suspensions into their solid and liquid components, comprising a machine housing, a drum rotatingly mounted in the machine housing and receiving the suspension, and a filler pipe leading into the drum for feeding the suspension into the drum, the machine housing being mounted for pivotal movement about an axis of rotation, and a force measuring element sensing weight-dependent deflections of the machine housing occurring about the axis of rotation and originating from a different degree of filling of the drum with suspension or from a different dewatering of the solid suspension components, and the machine housing deflections being indicated on a measurement value indicator.

An apparatus of this kind is known from DE 43 16 081 C1. In the front part of the housing a slight positive pressure can be generated in order to prevent separated liquid from passing over into the solids space. A slight negative pressure can be generated in the front part of the housing in order to prevent solids from passing over into the liquid discharge area when these are being withdrawn. It is, furthermore, known (WO 89/05193 A1; WO 92/04982 A1) to subject the drum of the centrifuge to positive pressure or negative pressure in order to, for example, influence the filtration process or the drying of the solid suspension components which are present in the form of a filter cake. However, on introducing a positive pressure or a negative pressure into the drum, interfering forces naturally occur which falsify the weight measurement of the centrifuge operating insofar like a beam-type balance.

SUMMARY OF THE INVENTION

The object of the invention is to so improve a generic apparatus that also upon introduction of a positive pressure or a negative pressure into the drum, no interference occurs in the weight-dependent measurements at the centrifuge.

The object is accomplished in accordance with claim 1 in a generic apparatus in that a pipeline is provided for generating a positive pressure or a negative pressure in the drum, and the line of application of the force generated in this pipeline on account of the positive pressure or the negative pressure is guided so as to intersect the axis of rotation of the machine housing.

In accordance with an embodiment of the invention, the object is accomplished in a generic apparatus in that a pipeline is provided for generating a positive pressure or a negative pressure in the drum, and a sensor sensing the pressure in the drum corrects the measurement value indicator in dependence upon the pressure.

BRIEF DESCRIPTION OF THE DRAWINGS

Embodiments of the invention are shown in the drawings and explained in greater detail herein below. The drawings show.

DETAILED DESCRIPTION OF THE DRAWINGS

Figure 1:
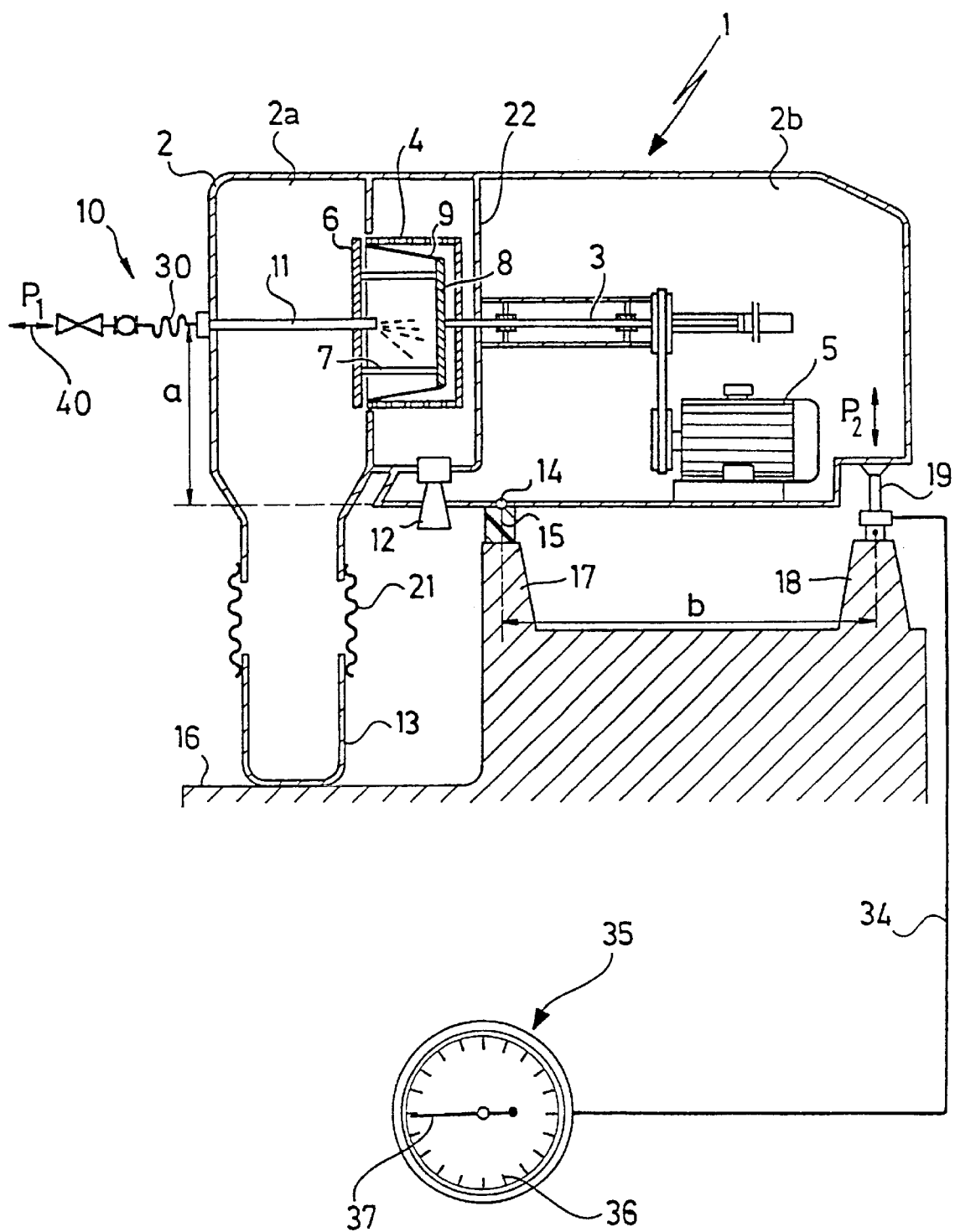
FIG. 1 an inverting filter centrifuge suitable for gravimetric determination of the degree of filling with a pipeline for subjecting the drum to a positive pressure or a negative pressure.

The inverting filter centrifuge 1 shown schematically in FIG. 1, which serves to process suspensions of different weight, comprises in a known manner a drum 4 mounted for rotation on a shaft 3 in a machine housing 2. The drum 4 is rotatingly drivable by a drive motor 5 and closable by an axially displaceable lid 6. Rigidly connected to the lid 6 by beams 7 is an intermediate bottom 8 which moves together with the lid 6. A slightly conically extending filter cloth 9 is arranged between the outer edge of the intermediate bottom 8 and the front edge of the drum 4 adjacent to the lid 6. The housing 2 consists of a front part 2a and a rear part 2b which are separated from one another in a gastight manner by a dividing wall 22.

In the illustrated operating state of the centrifuge 1, a substance to be filtered, namely a suspension consisting of solids and liquid is fed through a filler pipe 11 into the drum 4. As a result of the rotation of the drum 4, the solid matter collects on the inside of the filter cloth 9 in the form of a so-called "cake", whereas the liquid after penetrating the filter cloth 9 passes through the perforated drum wall onto the outside of the drum 4 and is collected by a filtrate outlet 12. In order to remove the "cake" from the filter cloth 9 upon completion of the filtration, after cutting off the suspension supply, the lid 6 and with it the intermediate bottom 8 is moved towards the left in FIG. 1 so the filter cloth 9 is inverted and the "cake" moves from the inside thereof to the outside. By further rotation of drum 4 and the inverted filter cloth 9, the cake is spun off the filter cloth 9 into the front part 2a of the housing and drops into a removably arranged container 13. After the cake has been spun off, the lid 6 is closed again so the initial operating state is reached again and suspension to be filtered can be introduced anew through the filler pipe 11 into the drum 4.

The described assembly including housing 2, drum 4, drive motor 5 and filler pipe 11 is of rigid construction and is mounted for pivotal movement about a horizontal axis of rotation 14, i.e., in a vertical plane. The axis of rotation 14 is arranged on elastic buffer elements 15 which rest on a stationary base 17 connected to the ground 16. The buffer elements 15 can, for example, be standard rubber-metal elements and serve to absorb and damp vibrations which may be caused by the rotation of the drum 4. The axis of rotation 14 may be dispensed with materially if the buffer elements 15 themselves simultaneously permit pivotal movement of the assembly in a vertical plane.

A force measuring element 19, for example, a load cell, known per se, which can be subjected to traction or pressure, is arranged between the housing 2 and a further stationary base 18. The entire assembly thus acts like a beam-type balance: The side of the centrifuge 1 located on the left of the horizontal axis of rotation 14 undergoes loading by the suspension introduced into the drum 4 through the filler pipe 11, and the force measuring element 19 located on the right of the axis of rotation 14 is thereby influenced accordingly. The force measuring element 19 is connected by an electric line 34 to a measurement value indicator 35 calibrated, for example, in weight or filling level units, with a pointer 37 moving over a scale 36.

To eliminate measurement errors, in order to cut off the centrifuge 1 operating like a beam-type balance from the surroundings, the machine housing 2 is connected to the container 13 by a flexible, gastight coupling device 21, for example, a bellows, so the left side of the assembly can pivot freely about the axis of rotation 14. Also a pipeline 10 connected to the filler pipe 11 for feeding the suspension is provided in a corresponding way with a flexible pipeline section 30 in order to similarly permit disturbance-free pivoting of the assembly about the axis of rotation 14.

In certain applications, performance of the filtration process at a positive pressure or a negative pressure in the drum 4 is desired. In the illustrated embodiment, such a pressure is generated via the pipeline 10 and the filler pipe 11 in the interior of the drum 4 enclosed by the filter cloth 9. This pressure naturally results in the creation of a force $P_1$ which is dependent upon the cross section of the filler pipe 11 and on account of the horizontal introduction of the pressure in FIG. 1 likewise acts horizontally in the direction of the double arrow 40 and on account of the distance a of the filler pipe 11 from the axis of rotation 14 generates a corresponding torque $P_1 \times a$ which depending on whether a positive pressure or a negative pressure prevails, acts in the direction of rotation oriented towards the right or towards the left. On the opposite side of the axis of rotation 14, a torque $P_2 \times b$ is generated by the force $P_1$ as reaction at the force measuring element 19 and is represented by the relationship $$P_1 \times a = P_2 \times b \tag{1}$$

where the lever arm between the axis of rotation 14 and the force measuring element is designated by b.

In this formula, the force $P_2$ acts as an interfering force falsifying the weight measurement. There follows from the above formula for this interfering force $P_2$ $$P_2 \times P_1 \times a/b \tag{2}$$

Therefore, the interfering force $P_2$ is naturally a direct function of the force $P_1$ directly dependent upon the positive pressure or negative pressure which is introduced, and it is a question of eliminating the influence of this interfering force $P_2$.

Figure 2:
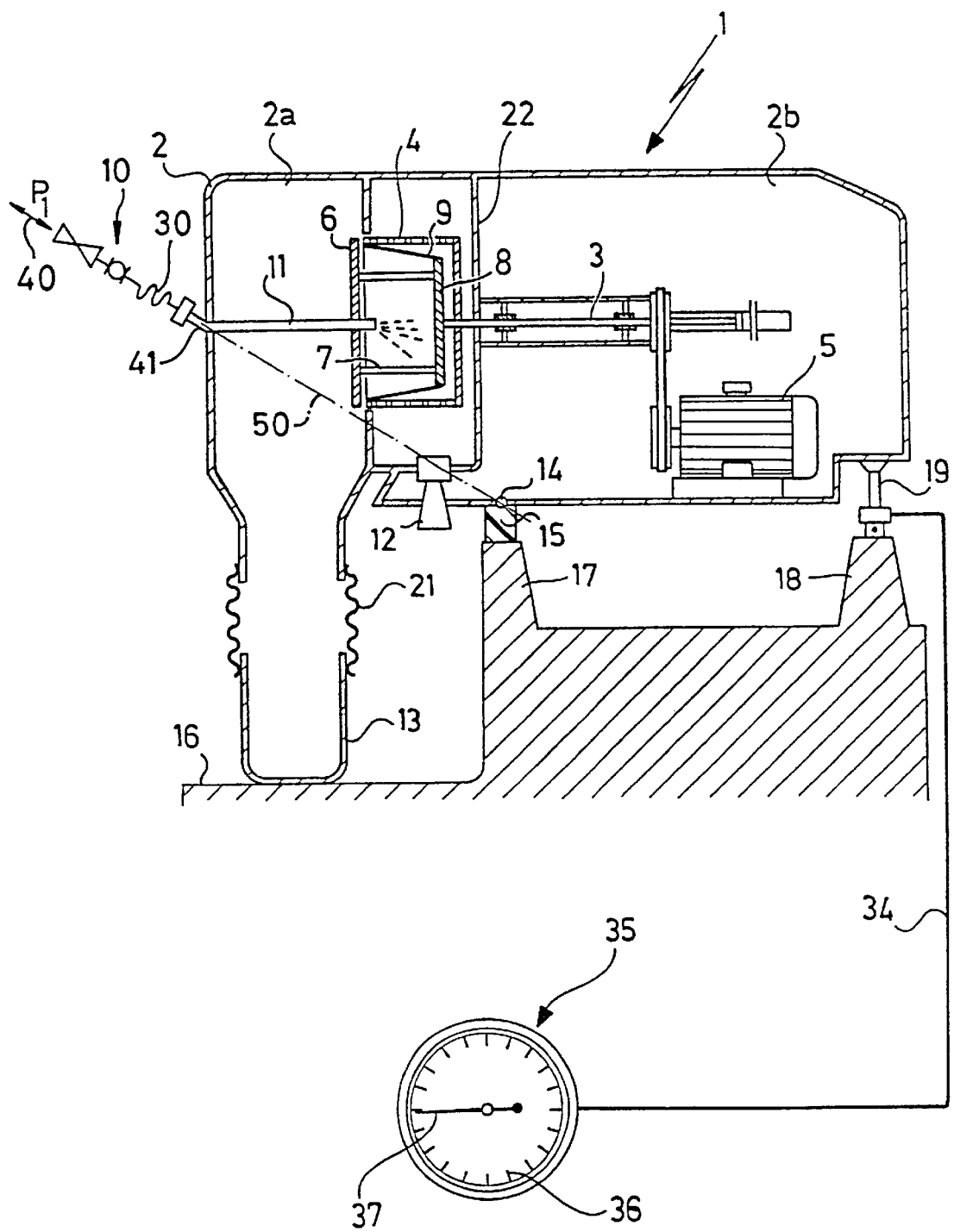
FIG. 2 a first embodiment.

In the embodiment shown in FIG. 2, the filler pipe 11 is rigidly connected at the point at which it enters the machine housing 2 to an elbow 41 which, in turn, is connected to the flexible pipeline section 30 of the pipeline 10. The angle of curvature of the elbow 41 is selected such that upon introduction of a positive pressure or a negative pressure, the line of application 50, indicated by dots and dashes in FIG. 2, of the resulting force $P_1$, indicated by the double arrow 40, intersects the axis of rotation 14. The force component/distance a indicated in FIG. 1 thus becomes zero, and in accordance with the above formula (2) the interfering force $P_2$ thus also disappears, and so an unimpeded weight measurement can be carried out.

Figure 3:
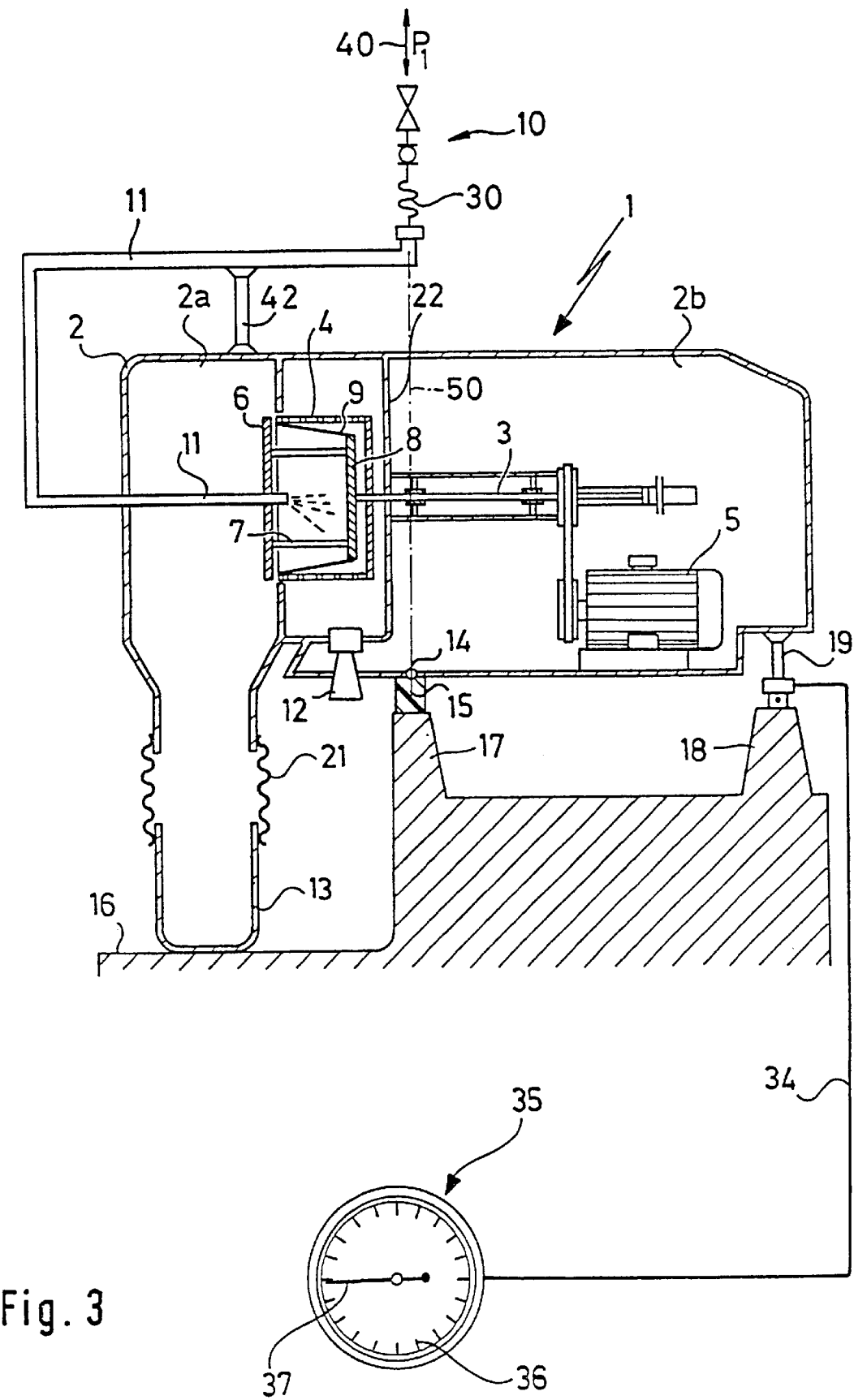
FIG. 3 an embodiment which is modified in relation to FIG. 2.

FIG. 3 shows an embodiment which is modified in relation to

FIG. 2 insofar as the prolonged filler pipe 11 is bent twice at a right angle and guided over the machine housing 2 on which it is supported by a column 42. The vertically upwardly curved end of the filler pipe 11 which again is connected by the flexible pipeline section 30 to the pipeline 10, lies such that its axis, as indicated by a dot-and-dash line, intersects the axis of rotation 14. Therefore, when introduction of a positive pressure or a negative pressure at the end of the filler pipe 11 connected to the pipeline section 30 results in the creation of a force $P_1$ oriented upwards or downwards in the direction of the double arrow 40, its line of application 50 again runs through the axis of rotation 14, and, for the reasons explained in conjunction with FIG. 2, no interfering force $P_2$ is created.

Figure 4:
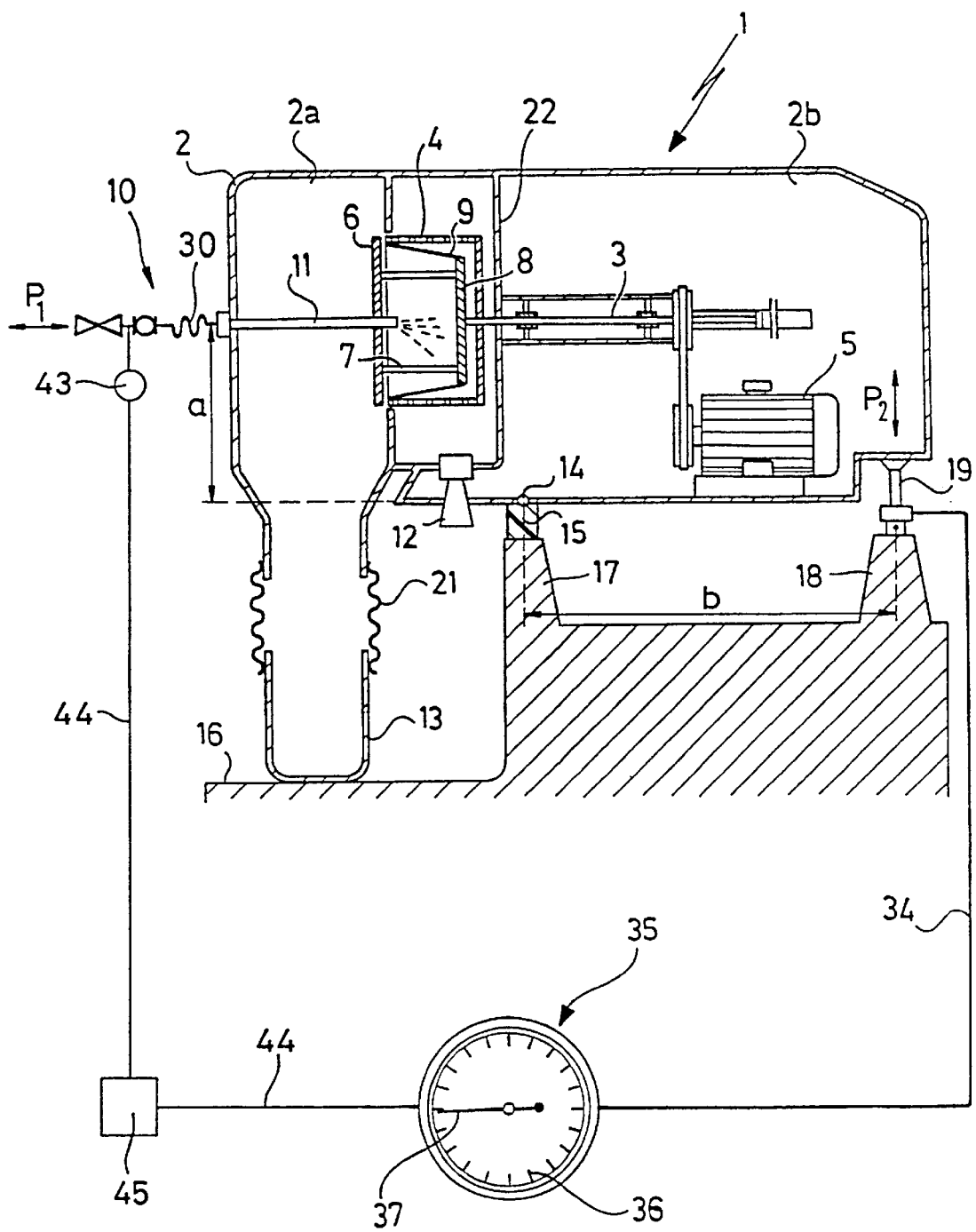
FIG. 4 a third embodiment based on a different principle.

In the embodiment according to FIG. 4, in which corresponding parts are designated by the same reference numerals as in FIGS. 1 to 3, again owing to the horizontal introduction of a positive pressure or a negative pressure and the thus created force $P_1$, the above relationship (2) applies, according to which the interfering force $P_2$ depends upon the force $P_1$ determined by the positive pressure or negative pressure introduced. However, the force $P_1$ depends directly upon the pressure prevailing in the pipeline 10 and hence in the filler pipe 11 and the drum 4. This pressure is sensed by a sensor 43 at the pipeline 10. In other embodiments, the sensor 43 could also be mounted at the filler pipe 11 or at the drum 4. The sensor 43 is connected to the measurement value indicator 35 by a line 44 containing an electronic unit 45, known per se, which calculates the interfering force $P_2$ occurring in the embodiment according to FIG. 4 in dependence upon the prevailing positive pressure or negative pressure and respectively corrects the position of the pointer 37 in dependence upon this interfering force $P_2$ so the pointer 37 indicates the true measured value (for example, weight units or filling level units). Hence, in the according to FIG. 4, the interfering force $P_2$ prevailing on account of positive pressure or negative pressure in the drum 4 is also compensated.

Figure 5:
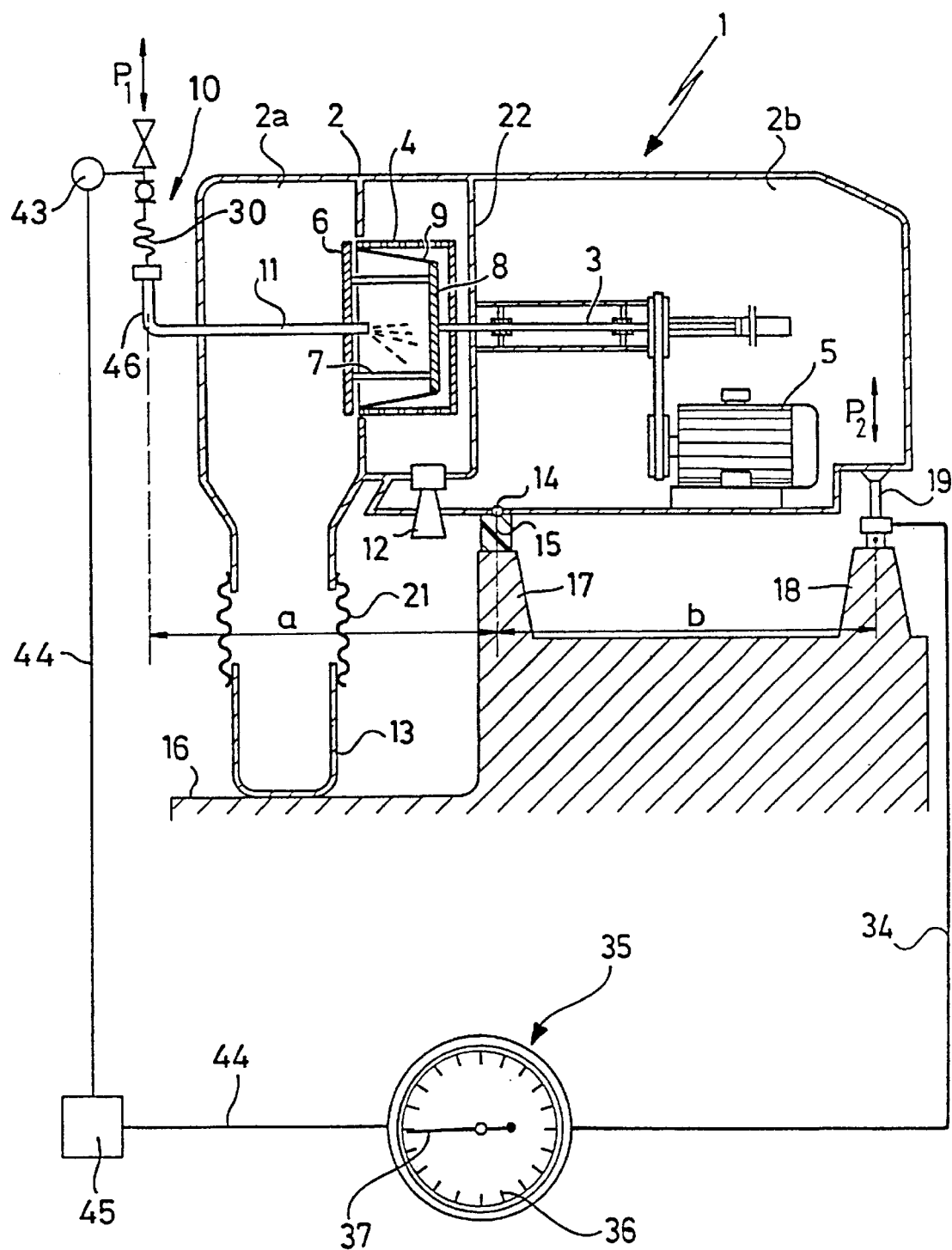
FIG. 5 an embodiment which is modified in relation to FIG. 4.

The embodiment according to FIG. 5 differs from that according to FIG. 4 solely in that the filler pipe 11 does not comprise a horizontal end section but a vertically terminating elbow 46 and so in the case of positive pressure or negative pressure the resulting force $P_1$ acts vertically and is effective with a different force component according to distance a than in FIG. 4. In this case, too, a sensor 43 is again arranged at the pipeline 10, and in conjunction with the electronic unit 45, as described with reference to FIG. 4, continuously corrects the measurement value indicator 35 so the interfering force $P_2$ is compensated at all times and an exact reading of the pertinent measurement value is possible.

I claim:

1. An apparatus for carrying out a weight measurement in a centrifuge for separating a suspension into solid and liquid components, comprising a machine housing, a drum rotatingly mounted in said machine housing and receiving said suspension, and a filler pipe leading into said drum for feeding said suspension into said drum, said machine housing being mounted for pivotal movement about an axis of rotation, and a force measuring element sensing weight-dependent deflections of said machine housing occurring about said axis of rotation and originating from a different degree of filling of said drum with suspension or from a different dewatering of said solid suspension components, and said machine housing deflections being indicated on a measurement value indicator, wherein said drum is closable with a lid, said filler pipe is provided on the feed side of said drum for generating a positive pressure or a negative pressure in said drum, and a sensor sensing the pressure in said drum on the feed side corrects said measurement value indicator in correspondence with the pressure.

* * * * *

UNITED STATES PATENT AND TRADEMARK OFFICE
CERTIFICATE OF CORRECTION

PATENT NO.    : 6,408,703 B2
DATED         : June 25, 2002
INVENTOR(S)   : Gerteis It is certified that error appears in the above-identified patent and that said Letters Patent is hereby corrected as shown below:

Title page,
Item [56], References Cited, "Hertschel" should read -- Hentschel --.
Reference -- 4,769,133 Brookes et al. 9/1988 -- should be added.
"DE 43160810" should read -- DE 4316081 --.
"DE 196 45 511" should read -- DE 19648511 --.

Column 4,
Line 29, "in the according" should read -- in the assembly according --.

Signed and Sealed this

Nineteenth Day of November, 2002

*Attest:*

*Attesting Officer*

JAMES E. ROGAN
*Director of the United States Patent and Trademark Office*